US012143210B1

United States Patent
Polaganga et al.

(10) Patent No.: US 12,143,210 B1
(45) Date of Patent: Nov. 12, 2024

(54) DYNAMIC RAT ASSIGNMENT FOR DUAL-CAPABLE IOT DEVICES

(71) Applicant: T-Mobile Innovations LLC, Overland Park, KS (US)

(72) Inventors: Roopesh Kumar Polaganga, Bothell, WA (US); Sreekar Marupaduga, Overland Park, KS (US); Rishitha Ponugoti, Kirkland, WA (US); Deepak Nadh Tammana, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 337 days.

(21) Appl. No.: 17/206,945

(22) Filed: Mar. 19, 2021

(51) Int. Cl.
  *H04L 1/00* (2006.01)
  *H04W 4/80* (2018.01)
  *H04W 24/08* (2009.01)
  *H04W 28/02* (2009.01)

(52) U.S. Cl.
  CPC ............ *H04L 1/0021* (2013.01); *H04W 4/80* (2018.02); *H04W 24/08* (2013.01); *H04W 28/0268* (2013.01)

(58) Field of Classification Search
  CPC ...... H04L 1/0021; H04W 4/80; H04W 24/08; H04W 28/0268
  See application file for complete search history.

(56) References Cited

U.S. PATENT DOCUMENTS

| | | | |
|---|---|---|---|
| 10,477,367 B2 | 11/2019 | Blankenship et al. | |
| 11,546,920 B2 * | 1/2023 | Veinpel | H04W 72/543 |
| 2015/0031377 A1 * | 1/2015 | Charbit | H04W 72/0453 |
| | | | 455/450 |
| 2015/0208286 A1 * | 7/2015 | Ozturk | H04W 36/14 |
| | | | 370/331 |
| 2017/0230880 A1 * | 8/2017 | Oroskar | H04W 28/0289 |
| 2018/0227902 A1 * | 8/2018 | Gholmieh | H04B 7/0413 |
| 2020/0374852 A1 | 11/2020 | Khoshnevisan et al. | |
| 2021/0004222 A1 * | 1/2021 | Huang | H04L 65/1016 |
| 2021/0258924 A1 * | 8/2021 | Jose | H04W 72/042 |
| 2021/0385893 A1 * | 12/2021 | Jin | H04W 12/55 |

* cited by examiner

*Primary Examiner* — Charles C Jiang
*Assistant Examiner* — Shawn D Miller
(74) *Attorney, Agent, or Firm* — Jones Robb, PLLC

(57) ABSTRACT

A system and method of managing network resources is provided, in which a resource usage threshold for an access node to which a wireless device is connected, wherein the wireless device is configured for communication in both of a first communication mode and a second communication mode is set; a resource usage of the access node in the first communication mode is monitored; the monitored resource usage to the resource usage threshold is compared; and in response to a determination that the resource usage exceeds the resource usage threshold, the wireless device is caused to switch from the first communication mode to the second communication mode.

16 Claims, 7 Drawing Sheets

DYNAMIC RAT ASSIGNMENT FOR DUAL-CAPABLE IOT DEVICES

TECHNICAL BACKGROUND

A wireless network, such as a cellular network, can include an access node (e.g., a base station) serving multiple wireless devices or user equipment (UE) in a geographical area covered by a radio frequency transmission provided by the access node. Different carriers or carrier divisions within the cellular network may utilize different types of radio access technologies (RATs). RATs can include, for example, 3G RATs such as Global System for Mobile Communications (GSM), Code-Division Multiple Access (CDMA), etc.; 4G RATs such as Worldwide Interoperability for Microwave Access (WiMAX), Long Term Evolution (LTE), etc.; and 5G RATs such as new radio (NR).

Additionally, in recent years, networks have evolved to connect using the Internet of things (IoT), which describes the network of physical objects or things that are embedded with sensors, software, and other technologies for the purpose of connecting and exchanging data with other devices and systems over the Internet. Cellular IoT is a way of connecting physical devices such as sensors to the internet by having them utilize the same mobile networks as wireless devices. In the consumer market, IoT technology is frequently utilized to equip the "smart home," including devices and appliances such as lighting fixtures, thermostats, home security systems and cameras, and other appliances which support one or more common ecosystems, and can be controlled via devices associated with that ecosystem, such as smartphones and smart speakers. Cellular IoT itself is a rapidly growing ecosystem based on 3rd Generation Partnership Project (3GPP) global standards, supported by an increasing number of mobile network providers as well as device, chipset, module, and network infrastructure vendors. Cellular IoT improves over other Low Power Wide Area (LPWA) network technologies in terms of quality of service (QOS), scalability, flexibility, and the like.

Deployment of the evolving RATs in a network provides numerous benefits. For example, newer RATs may provide additional resources to subscribers, faster communications speeds, and other advantages. However, newer technologies may also have limited range in comparison to existing technologies. To ensure consistent coverage through a wide geographic range, existing technologies are often used in combination with newer technologies. Cellular IoT applications generally use one of two technologies: narrowband IoT (NB-IoT) and Category M1 (Cat-M1), which are both 3GPP standardized technologies. The technologies address different types of use cases based on their capabilities.

NB-IoT supports devices with a bandwidth of 200 kHz. Due to its narrow bandwidth, the data rate peaks at around 250 kilobits per second (kbps). An NB-IoT carrier can be deployed even in guard-band of an LTE carrier. Exemplary use cases of NB-IoT include utility meters and sensors. NB-IoT provides advantages including low complexity, low cost, ubiquitous coverage, low data rate, and low power computing. NB-IoT may be particularly suitable for transferring small amounts of information, as it uses only a narrow band. With extreme coverage capability, NB-IoT may be used to support very low data rate applications in extremely challenging radio conditions.

Cat-M1 operates at 1.4 MHz bandwidth with higher device complexity/cost than NB-IoT. The wider bandwidth allows Cat-M1 to achieve greater data rates (up to 1 megabit per second (Mbps)), lower latency, and more accurate device positioning capabilities. Cat-M1 supports voice calls and connected mode mobility. Exemplary use cases for Cat-M1 include connected vehicles, wearable devices, trackers, and alarm panels. Both NB-IoT and Cat-M1 devices can exist in a sleep mode for extended periods of time, which greatly reduces device power consumption.

Certain network operators provide services via multiple RATs simultaneously. For example, a network operator may provide both NB-IoT and Cat-M1 services simultaneously. Devices are accepted and served by the network as either NB-IoT or Cat-M1 devices depending on a device request. Some IoT devices are capable of supporting both NB-IoT and Cat-M1 RATs. If such devices are not allocated with the network capabilities and/or resource usage in mind, large numbers of such devices may introduce inefficiencies, negatively impact device or network performance, and/or otherwise result in a reduced user experience. Thus, there exists a need for systems and methods for leveraging such capability to provide service efficiently; for example, by dynamically changing the device configuration to a particular RAT (such as NB-IoT) without impacting user experience.

Overview

Various aspects of the present disclosure relate to systems and methods of managing network resources.

In one exemplary aspect of the present disclosure, a managing network resources comprises: setting a resource usage threshold for an access node to which a wireless device is connected, wherein the wireless device is configured for communication in both of a first communication mode and a second communication mode; monitoring a resource usage of the access node in the first communication mode; comparing the monitored resource usage to the resource usage threshold; and in response to a determination that the resource usage exceeds the resource usage threshold, causing the wireless device to switch from the first communication mode to the second communication mode.

In another exemplary aspect of the present disclosure, a system for managing network resources comprises: an access node including at least one electronic processor configured to perform operations including: setting a resource usage threshold for an access node, monitoring a resource usage of the access node in the first communication mode, receiving a join request from a wireless device, wherein the wireless device is configured for communication in both of the first communication mode and a second communication mode, comparing the monitored resource usage to the resource usage threshold, in response to a determination that the resource usage does not exceed the resource usage threshold, assigning the wireless device to the first communication mode, and in response to a determination that the resource usage exceeds the resource usage threshold, assigning the wireless device to the second communication mode.

In another exemplary aspect of the present disclosure, a method of managing network resources comprises: defining a usage parameter condition for an access node; receiving a join request from a wireless device, wherein the wireless device is configured for communication in both of the first communication mode and a second communication mode; monitoring a usage parameter of the wireless device; in response to a determination that the usage parameter does not meet the usage parameter condition, assigning the wireless device to the first communication mode; and in response to a determination that the usage parameter meets the usage parameter condition, assigning the wireless device to the second communication mode.

In this manner, these and other aspects of the present disclosure provide for improvements in at least the technical field of telecommunications, as well as the related technical fields of network management, device management, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

Figure 1:
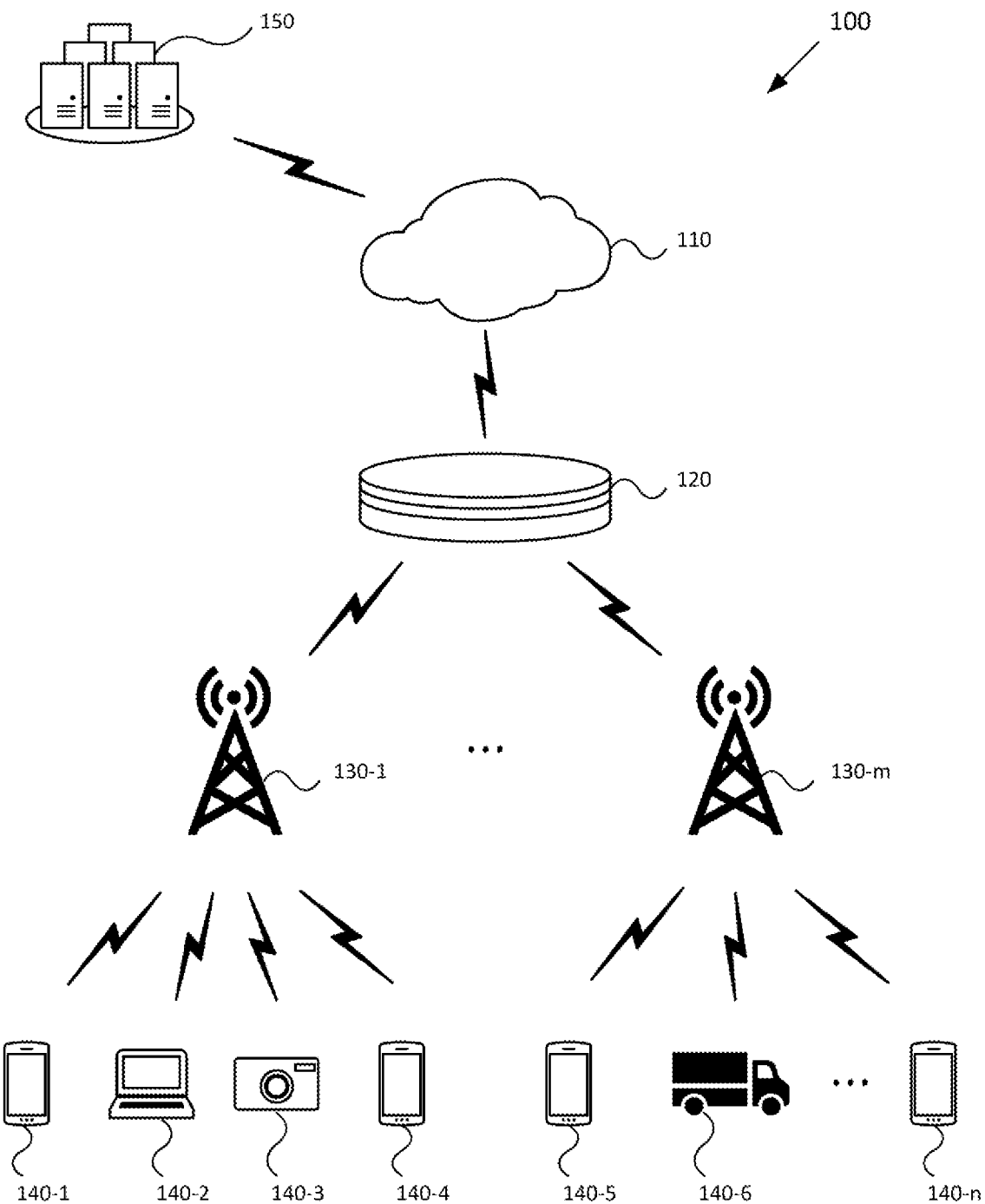
FIG. 1 illustrates an exemplary system for wireless communication in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

In accordance with various aspects of the present disclosure, a cellular or wireless network may be provided by an access node. The access node may utilize one or more antennas to communicate with wireless devices or UEs. As the number of simultaneous wireless devices with which an access node communicates increases, so too does resource usage. In one example, consider a scenario in which a network operator is serving both Cat-M1 (e.g., with six physical resource blocks within a host LTE cell) and NB-IoT (e.g., with a dedicated 200 kHz carrier in guardband/standalone mode) and in which an IoT device capable of supporting both Cat-M1 and NB-IoT technologies is trying to access the operator's Cat-M1 cell to send small packets of data. During times of high LTE utilization, this IoT device may get rejected if there are no free physical resource blocks that can be allocated to Cat-M1. This IoT device may continue to get rejected for as long as LTE utilization remains high, thus impacting user experience. In such a scenario, the NB-IoT capability of this IoT device has not been leveraged to make this packet transaction, when the NB-IoT capability could have saved device battery life, etc.

Thus, various aspects of the present disclosure may operate in an IoT cellular network utilizing multiple RATs, such as NB-IoT and Cat-M1. By providing a system and method to dynamically assign a RAT of IoT devices which support both NB-IoT and Cat-M1 (e.g., based on cell utilization), the present disclosure may improve the overall service delay for IoT devices, may improve the battery usage parameters of an NB-IoT device, improve overall cell resource utilization, and so on.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node. Additionally, "wireless device" may encompass any type of wireless device, such as sensors that may be connected to a network as an IoT device.

Examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node.

Embodiments disclosed herein operate in a network supporting NB-IoT, which is configured for a high volume of low-complexity devices. NB-IoT can effectively serve devices in challenging radio environments such as deep building or underground radio signal penetration. UEs can be specifically configured with a chipset supporting NB-IoT. Further, embodiments supposed herein operate in a network supporting Cat-M1, which is also supported by devices having a particular chipset. Cat-M1 supports lower data-rate applications and is appropriate for low-power sensing and monitoring devices such as health and fitness wearables, utility meters, and vending machines, tracking, and other applications. Cat-M1 offers a lower bandwidth than most cellular services, although higher than NB-IoT applications.

FIG. 1 illustrates an exemplary system 100 for use with various aspects of the present disclosure. As illustrated, the system 100 includes a cloud platform 110, a core network 120, and a plurality of access nodes 130-1 to 130-*m* (collectively referred to as access nodes 130), and a plurality of wireless devices 140-1 to 140-*n* (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network via a wired connection.

The cloud platform 110, which may be an IoT cloud platform, may perform processing and forward results to the computing systems and devices 150 and/or the wireless devices 140. The core network 120, which may be an IoT core network, connects with the cloud platform 110 and the access nodes 130. Examples of the access nodes 130 will be described in more detail below with respect to FIGS. 2 and 3.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or low-complexity devices designed to communicate infrequently such as sensors, meters, wearables, trackers, and the like. The wireless devices 140 may be deployed in many environments, including remote and/or challenging radio environments such as the basement of a building or on a moving piece of machinery. In some implementations, the wireless devices 140 may send occasional signals for several years without a change or charge of battery. The core network 120 can collect and analyze data from sensors in the wireless devices 140 for real-time monitoring, GPS tracking, mobile route tracking, utility usage monitoring, and the like. Examples of the wireless devices 140 will be described in more detail below with respect to FIGS. 2 and 4.

One or more of the access nodes 130 and one or more of the wireless devices 140 may be configured to operate using NB-IoT and Cat-M1 RATs. NB-IoT supports ultra-low complexity devices with a narrow bandwidth of 200 kHz. Due to the narrow bandwidth, the data rate peaks at around 250 kbps. An NB-IoT carrier can be deployed in a guard-band of an LTE carrier to use a portion of the spectrum that would otherwise be unused. In-band operation allows NB-IoT to operate using one physical resource block (PRB) of an LTE carrier. Cat-M1 operates at 1.4 MHz bandwidth. Typically, Cat-M1 devices have a higher complexity and cost than NB-IoT devices. The wider bandwidth allows Cat-M1 to achieve greater data rates and lower latency, with more accurate device positioning capabilities. Cat-M1 may operate using six PRBs of the LTE carrier.

Both NB-IoT and Cat-M1 devices are capable of operating in sleep mode for extended periods of time with, for example, extended Discontinuous Reception (eDRX) and Power Saving Mode (PSM) functionalities, which greatly reduces device power consumption. Furthermore, both RATs support enhanced signal coverage per base station. With extreme coverage capability, NB-IoT may be especially used for supporting very low data rate applications in extremely challenging radio conditions. Where a device (such as a wireless device 140) is capable of operation in both NB-IoT and Cat-M1, it may be referred to as a "dual-capable" or "dual-capability" device. Dual capability may be provided by equipping the device with a chipset designed to utilize both NB-IoT and Cat-M1 RATs.

Figure 2:
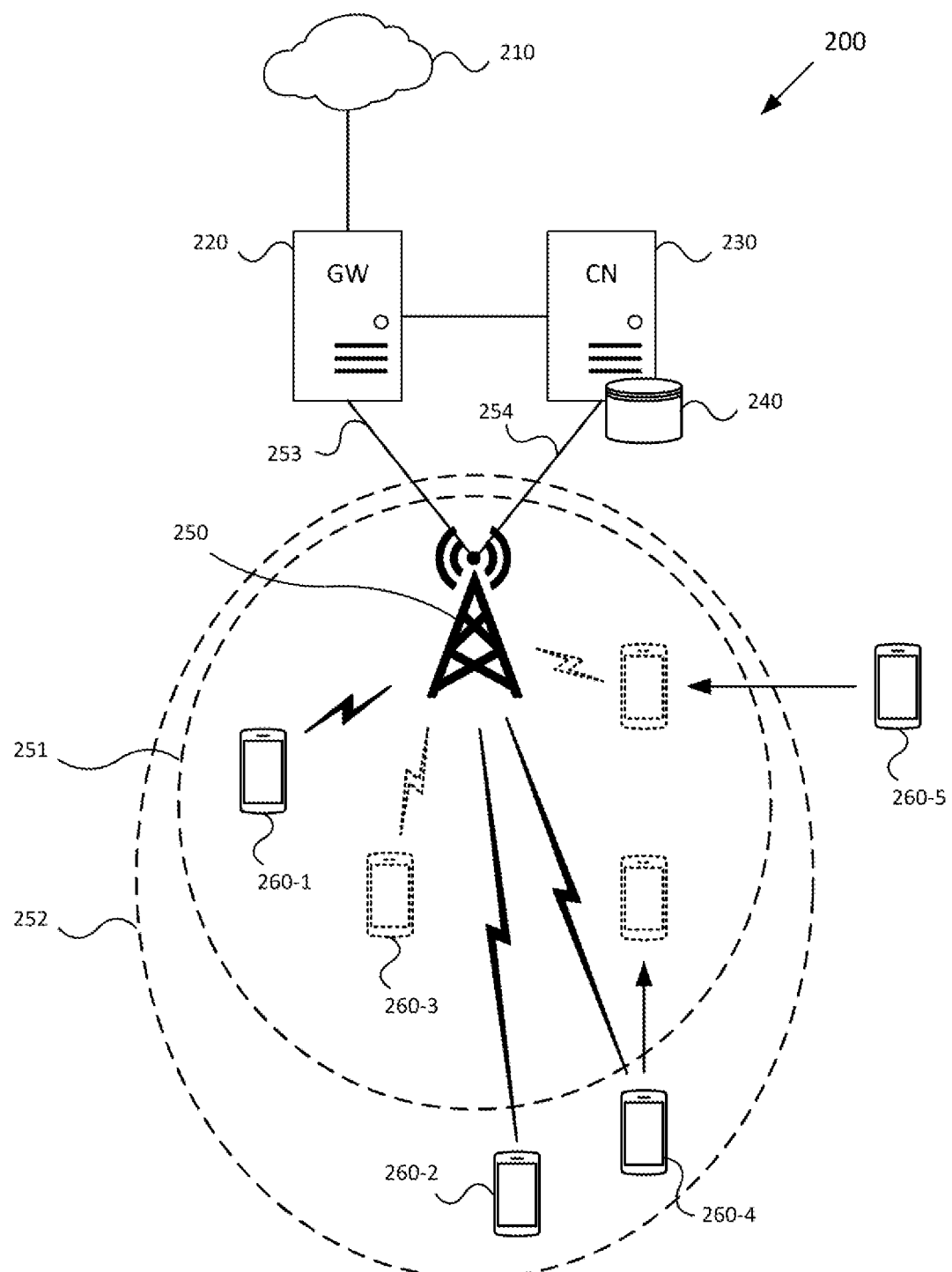
FIG. 2 illustrates an exemplary configuration of a system for wireless communication in accordance with various aspects of the present disclosure.

FIG. 2 illustrates a configuration for an exemplary system 200 in accordance with various aspects of the present disclosure. As illustrated, the system 200 comprises a communication network 210, a gateway 220, a controller node 230 which includes a database 240, an access node 250, and a plurality of wireless devices 260-1 to 260-5 (collectively referred to as wireless devices 260). For purposes of illustration and ease of explanation, only one access node 250 is shown; however, as noted above with regard to FIG. 1, additional access nodes 250 may be present in the system 200. While five wireless devices 260 are shown for purposes of explanation, in practical implementations, any number of the wireless devices 260 (including zero or one) may be present at any given time.

The access node 250 is dual-capable, and is illustrated as having a first coverage area 251 (e.g., corresponding to a first RAT) and a second coverage area 252 (e.g., corresponding to a second RAT). In one example, the first RAT is NB-IoT and the second RAT is Cat-M1. In another example, the first RAT is Cat-M1 and the second RAT is NB-IoT. Each of the wireless devices 260 are present or may become present in one or both of the first coverage area 251 and the second coverage area 252. While the second coverage area 252 is illustrated as being larger than the first coverage area 251 for purposes of illustration and explanation, in some implementations the first coverage area 251 and the second coverage area 252 may be similarly sized. Moreover, while the first coverage area 251 is illustrated as being subsumed within the second coverage area 252, in some implementations a portion of the first coverage area 251 may be outside of the second coverage area 252. The access node 250 may provide additional coverage areas corresponding to different RATs (such as 4G and/or 5G RATs), different frequency bands, and the like.

In the illustration of FIG. 2, three wireless devices 260-1, 260-2, and 260-4 are connected to and access network services from the access node 250, with the wireless device 260-1 being located in the first coverage area 251 (and therefore also in the second coverage area 252) and with the wireless devices 260-2 and 260-4 being located in the second coverage area 252. The wireless device 260-3 is illustrated with a dotted line to show that it may become introduced into the system 200 (e.g., by powering on or waking from a sleep mode). The wireless device 260-4 may be mobile and move into the first coverage area 251, also illustrated by a dotted line. Moreover, the wireless device 260-5 is illustrated as being outside of both the first coverage area 251 and the second coverage area 252, but may enter one or both of the first coverage area 251 and the second coverage area 252 as also illustrated by a dotted line. In accordance with various aspects of the present disclosure, the access node 250 may monitor resource usage of the wireless devices 260 and dynamically assign a RAT to one or more of the wireless devices 260. One or more of the wireless devices 260 may be dual-capable.

A scheduling entity may be located within the access node 250 and/or the controller node 230, and may be configured to allocate resources and RATs to improve overall network resource utilization and performance. This may be accomplished by, for example, assigning or allocating one or more of the wireless devices 260 to particular RATs. For example, if the wireless devices 260 are using more than a predetermined percentage (e.g., 50%, 80%, and so on) of the resources available for a particular RAT, the scheduling entity may determine that one or more wireless devices 260 should switch from one RAT to another, and/or may determine that one or more wireless devices 260 should be assigned to a particular RAT upon joining or attempting to join the network.

The access node 250 can be any network node configured to provide communications between the wireless devices 260 and communication network 210, including standard access nodes and/or short range, lower power, small access nodes. As examples of a standard access node, the access node 250 may be a macrocell access node, a base transceiver station, a radio base station, a gNodeB in 5G networks, an eNodeB in 4G/LTE networks, or the like. In one particular example, the access node 250 may be a macrocell access node in which a range of the first coverage area 251 and/or the second coverage area 252 is from approximately five to thirty-five kilometers (km) and in which the output power is in the tens of watts (W). As examples of a small access node, the access node 250 may be a microcell access node, a picocell access node, a femtocell access node, or the like, including a home gNodeB or a home eNodeB.

The access node 250 can comprise one or more processors and associated circuitry to execute or direct the execution of computer-readable instructions such as those described herein. In so doing, the access node 250 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 250 can receive instructions and other input at a user interface. The access node 250 communicates with the gateway node 220 and the controller node 230 via communication links 253 and 254, respectively. The access node 250 may also communicate with other access nodes using a direct link (e.g., an X2 link or the like).

Figure 3:
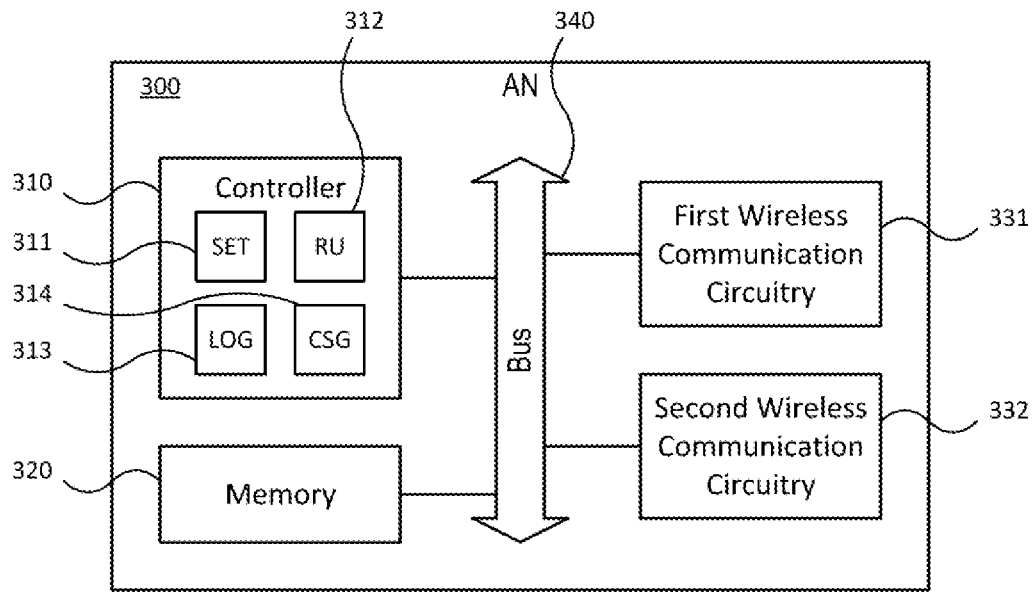
FIG. 3 illustrates an exemplary access node in accordance with various aspects of the present disclosure.

FIG. 3 illustrates one example of an access node 300, which may correspond to one or more of the access nodes 130 shown in FIG. 1 and/or the access node 250 shown in FIG. 2. As illustrated the access node 300 includes a controller 310, a memory 320, first wireless communication circuitry 331, second wireless communication circuitry 332, and a bus 340 through which the various elements of the access node 300 communicate with one another. As illustrated, the controller 310 includes sub-modules or units, each of which may be implemented via dedicated hardware (e.g., circuitry), software modules which are loaded from the memory 320 and processed by the controller 310, firmware, and the like.

As illustrated, the controller 310 includes a setting unit 311, which may be configured to set a resource usage threshold or other usage parameter condition for the access node 300; a resource usage unit 312, which may be configured to monitor a resource usage of the access node 300 in a first communication mode (e.g., Cat-M1); a logic unit 313, which may be configured to compare the monitored resource usage of the access node to the resource usage threshold or the usage parameter condition; and a control signal generation unit 314, which may be configured to cause a wireless device connected to the access node 250 to operate in the first communication mode or in a second communication mode (e.g., NB-IoT) based on a result of the comparison. The setting unit 311, the resource usage unit 312, the logic unit 313, and the control signal generation unit 314 are illustrated as residing within the controller 310 for ease of explanation; however, one or more of the units may instead reside within the memory 320 and/or may be provided as separate units within the access node 300. Moreover, while the setting unit 311, the resource usage unit 312, the logic unit 313, and the control signal generation unit 314 are illustrated as separate units, in practical implementations some or all of the units may be combined and/or share components.

The first wireless communication circuitry 331 and/or the second wireless communication circuitry 332 may respectively include circuit elements configured to generate wireless signals (e.g., one or more antennas) as well as interface elements configured, for example, to translate control signals from the controller 310 into data signals for wireless output. While FIG. 3 illustrates the first wireless communication circuitry 331 and the second wireless communication circuitry 332 as separate elements, some or all of the components may be shared between the first wireless communication circuitry 331 and the second wireless communication circuitry 332. The access node 300 may include additional wireless communication circuitry elements, for example to communicate using RATs other than the first communication mode and the second communication mode. The access node 300 may be configured to transmit commands via one or both of the first wireless communication circuitry 331 and the second communication circuitry 332. For example, the access node 300 may be configured to transmit a network command to a wireless device (e.g., to the wireless devices 140 or 260), thereby causing the wireless device to join the network in a particular RAT or to switch from one RAT to another.

Returning to FIG. 2, the wireless devices 260 may respectively be any device, system, combination of devices, or other such communication platform capable of communicating wirelessly with access node 250 using one or more frequency bands deployed therefrom; for example, a band dedicated to NB-IoT technology and/or a Cat-M1 band. The wireless devices 260 may respectively be, for example and without limitation, a mobile phone, a wireless phone, a wireless modem, a personal digital assistant (PDA), a voice over internet protocol (VOIP) phone, a voice over packet (VoP) phone, a voice over new radio (VoNR) device, a soft phone, a sensor, a meter, a tracking device, or other types of devices or systems which can exchange audio or data via the access node 250, including IoT devices.

Figure 4:
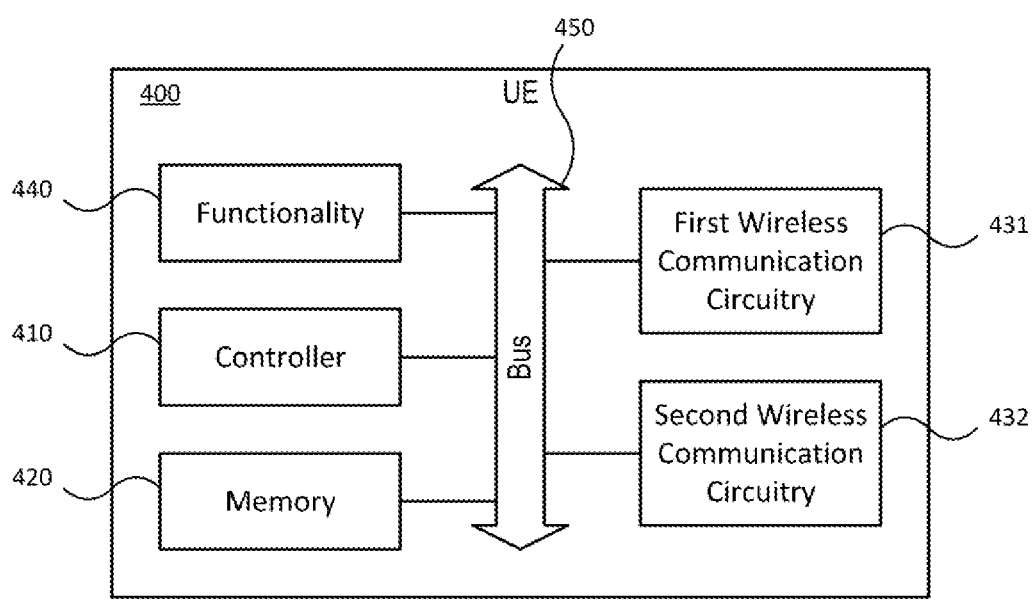
FIG. 4 illustrates an exemplary user equipment in accordance with various aspects of the present disclosure.

FIG. 4 illustrates one example of a wireless device 400 (i.e., a UE), which may correspond to one or more of the wireless devices 140 shown in FIG. 1 and/or one or more of the wireless devices 260 shown in FIG. 2. As illustrated the wireless device 400 includes a controller 410, a memory 420, first wireless communication circuitry 431, second wireless communication circuitry 432, a functionality component 440, and a bus 450 through which the various elements of the wireless device 400 communicate with one another. The functionality component 440 includes circuitry or other elements depending on the functionality of the wireless device 400. For example, if the wireless device 400 is a utility meter, the functionality component 440 may include one or more sensors. Moreover, if the wireless device 400 is a tracking device, the functionality component 440 may be a GPS tracker. The functionality component 440 may also be or include a user interface through which the wireless device 400 receives instructions and other input.

The first wireless communication circuitry 431 and/or the second wireless communication circuitry 432 may respectively include circuit elements configured to generate wireless signals (e.g., one or more antennas) as well as interface elements configured, for example, to translate control signals from the controller 410 into data signals for wireless output. While FIG. 4 illustrates the first wireless communication circuitry 431 and the second wireless communication circuitry 432 as separate elements, some or all of the components may be shared between the first wireless communication circuitry 431 and the second wireless communication circuitry 432. The wireless device 400 may include additional wireless communication circuitry elements, for example to communicate using RATs other than the first communication mode and the second communication mode. The controller 410 may be configured to receive, interpret, and/or respond to signals received via the first wireless communication circuitry 431, the second wireless communication circuitry 432, and/or the additional wireless communication circuitry elements. For example, the controller 410 may be configured to receive a network command (e.g., from an access node such as the access nodes 130, 250, or 300) and, in response thereto, to join the network in a particular RAT or to switch from one RAT to another.

Returning to FIG. 2, the communication network 210 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 210 can be capable of carrying data, for example to support voice, push-to-talk (PTT), broadcast video, and/or data communications by the wireless devices 260. Wireless network protocols can comprise Multimedia Broadcast Multicast Services (MBMS), CDMA, 1xRTT, GSM, Universal Mobile Telecommunications System (UMTS), High Speed Packet Access (HSPA), Evolution-Data Optimised (EV-DO), EV-DO rev. A, 3GPP LTE, WiMAX, 4G including LTE Advanced and the like, and 5G including 5G NR or 5G LTE, or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 210 may also comprise additional base stations, controller nodes, telephony switches, internet routers, network gateways, computer systems, communication links, other types of communication equipment, and combinations thereof.

The communication links 253 and 254 may respectively use various communication media, such as air, space, metal, optical fiber, other signal propagation paths, and combinations thereof. The communication links 253 and 254 may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1xRTT, GSM, UMTS, HSPA, EV-DO, EV-DO rev. A, 3GPP LTE, WiMAX, 4G including LTE Advanced and the like, and 5G including 5G NR or 5G LTE, or combinations thereof. The communication links 253 and 254 may respectively be a direct link or might include various equipment, intermediate components, systems, and networks. The communication links 253 and 254 may comprise many different signals sharing the same link.

The gateway node 220 may be any network node configured to interface with other network nodes using various protocols. The gateway node 220 can communicate user data over the system 200. The gateway node 220 may be a standalone computing device, computing system, or network component, and can be accessible by, for example, a wired or wireless connection, or through an indirect connection such as via a computer network or communication network. The gateway node 220 may include but is not limited to a serving gateway (SGW) and/or a public data network gateway (PGW). The gateway node 220 is not limited to any specific technology architecture, such as LTE or 5G NR, but may be used with any network architecture and/or protocol.

The gateway node 220 can comprise a processor and associated circuitry to execute or direct the execution of computer-readable instructions to obtain information. In so doing, the gateway node 220 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the gateway node 220 can receive instructions and other input at a user interface.

The controller node 230 may be any network node configured to communicate and/or control information over the system 200. The controller node 230 may be configured to transmit control information associated with resource usage thresholds and/or usage parameters. The controller node 230 may be a standalone computing device, computing system, or network component, and can be accessible by, for example, a wired or wireless connection, or through an indirect connection such as via a computer network or communication network. The controller node 230 may include but is not limited to a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, and the like. The controller node 230 is not limited to any specific technology architecture, such as LTE or 5G NR, but may be used with any network architecture and/or protocol.

The controller node 230 can comprise a processor and associated circuitry to execute or direct the execution of computer-readable instructions to obtain information. In so doing, the controller node 230 can retrieve and execute software from storage, which can include a disk drive, a flash drive, memory circuitry, or some other memory device, and which may be local or remotely accessible. As illustrated in FIG. 2, the controller node 230 includes the database 240 for storing information, such as predetermined resource usage thresholds utilized for dynamically managing RATs of the wireless devices 260, as well as positions and/or characteristics of the wireless devices 260. The database 240 may further store handover thresholds, scheduling schemes, and resource allocations for the access node 250, the wireless devices 260, and so on. This information may be requested or shared with the access node 250 via the communication link 254, X2 connections, and the like. The software may comprise computer programs, firmware, or some other form of machine-readable instructions, and may include an operating system, utilities, drivers, network interfaces, applications, or some other type of software, including combinations thereof. Moreover, the controller node 230 can receive instructions and other input at a user interface.

Other network elements may be present in system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access nodes 250 and communication network 210.

Devices or systems in accordance with various aspects of the present disclosure may perform various operations to dynamically assign a RAT to associated wireless devices. Exemplary methods including these operations are illustrated in FIGS. 5-8. The methods of FIGS. 5-8 may be triggered by various events, including but not limited to a wireless device attempting to join the network (e.g., the wireless device 260-3 shown in FIG. 2), a wireless device moving from a single-RAT coverage area to a multiple-RAT coverage area (e.g., the wireless device 260-4 shown in FIG. 2), or a wireless device moving from outside the coverage area into the network coverage area (e.g., the wireless device 260-5 shown in FIG. 2). The methods of FIGS. 5-8 may be performed by, for example, the scheduling entity described above. For purposes of explanation, the method of FIGS. 5-8 will be described as being performed in the access node; however, this is merely exemplary and not limiting.

Figure 5:
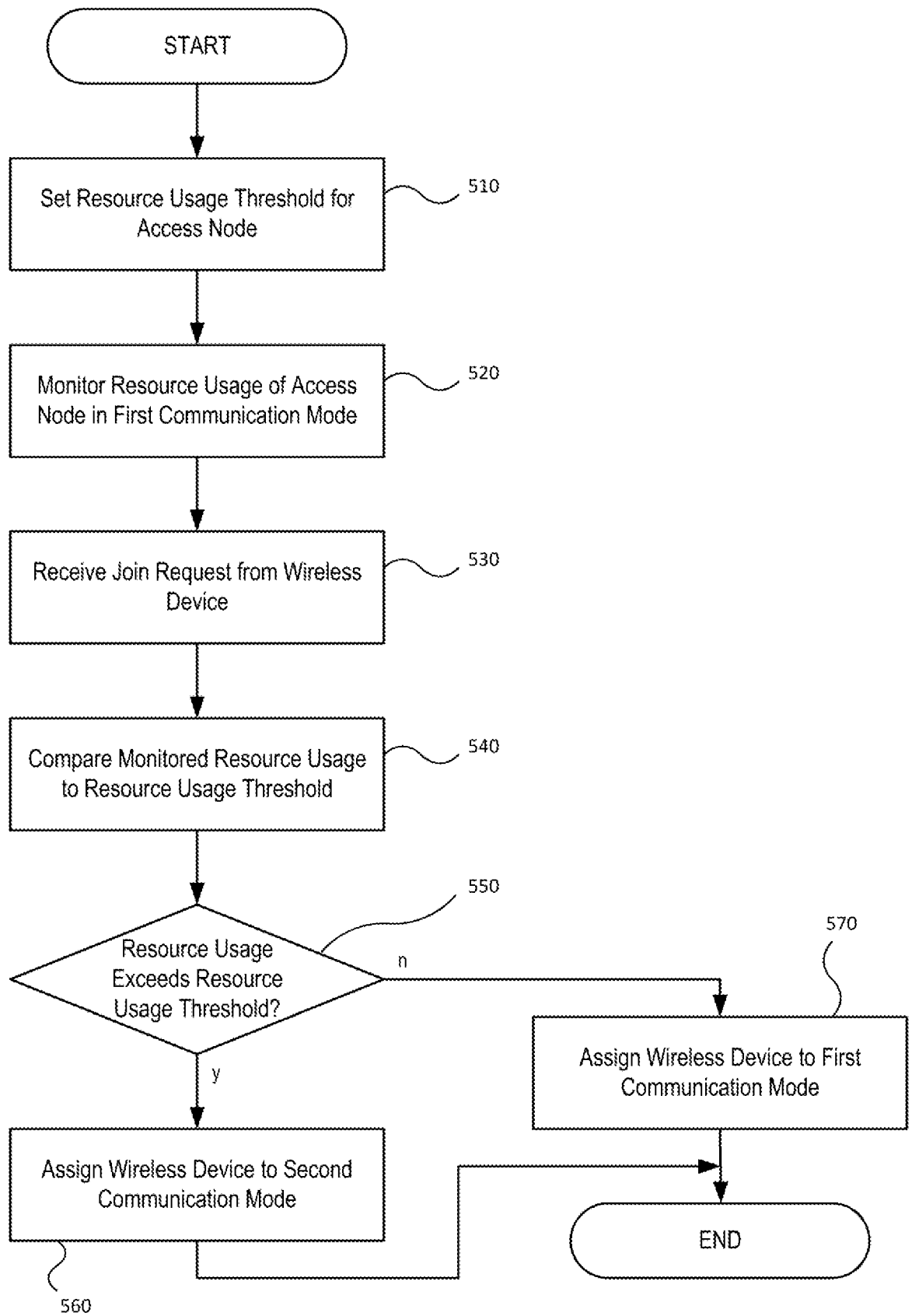
FIG. 5 illustrates an exemplary process flow for managing network resources in accordance with various aspects of the present disclosure.

FIG. 5 illustrates an exemplary method which may be performed when a dual-capable wireless device attempts to join the network (i.e., a device assignment method). At operation 510, the access node sets a resource usage threshold (e.g., a PRB utilization threshold). The resource usage threshold may refer to a percentage of available resources at which point the network is deemed to be highly-loaded or high-traffic. The resource usage threshold may be predetermined by a network operator, or may be determined in response to a network status. The resource usage threshold may be specific to a particular RAT, or may be a general value used for all RATs. In one particular example, the resource usage threshold may be 80% of available PRBs.

At operation 520, the access node monitors a resource usage corresponding to a first communication mode (e.g., Cat-M1). At operation 530, the access node receives a join request from a wireless device. In this example, the wireless device is a dual-capable device and the join request may indicate the device capabilities. Upon receiving the join request, at operation 540 the access node compares the monitored resource usage to the resource usage threshold. Thus, the access node determines whether the resource usage exceeds a resource usage threshold as indicated for operation 550. If the determination is that the resource usage does exceed the resource usage threshold, the access node assigns the wireless device to the second communication mode (e.g., NB-IoT) at operation 560. If the determination is that the resource usage does not exceed the resource usage threshold, the access node assigns the wireless device to the first communication mode at operation 570. The access node may perform the assignment by transmitting a network command to the wireless device.

The operations of FIG. 5 are not necessarily performed in a strict series from operation 510 to operation 570. In some implementations, the access node may perform operation 510 once for a given period of time, perform operation 520 repeatedly or continuously until a wireless device attempts to join the network, and then perform operations 530 to 570 thereafter. After the wireless device has been appropriately assigned (e.g., either operation 560 or 570 has occurred), the access node may return to operation 520 without resetting the resource usage threshold.

Figure 6:
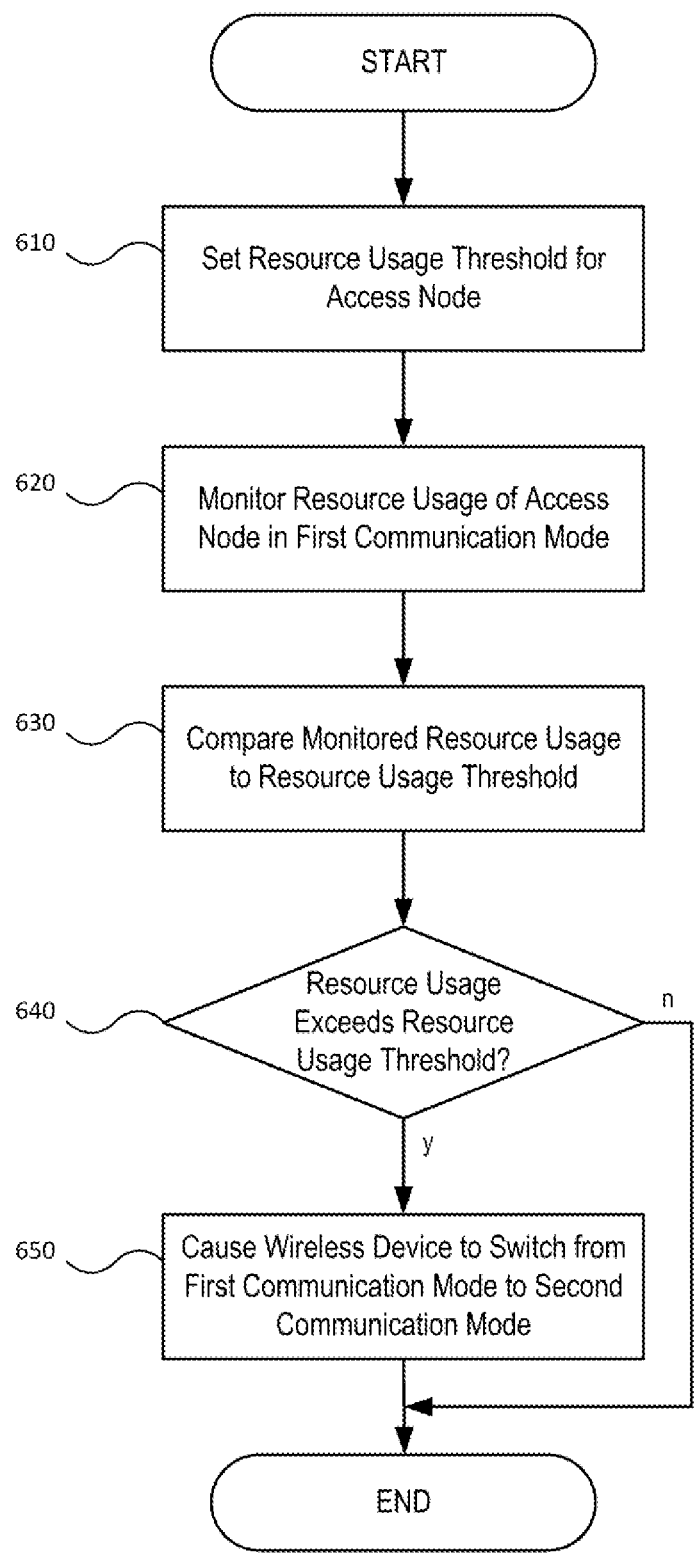
FIG. 6 illustrates another exemplary process flow for managing network resources in accordance with various aspects of the present disclosure.

FIG. 6 illustrates an exemplary method which may be performed in response to changes in network conditions, or when a wireless device that is not dual-capable (or is a dual-capable device which should operate in a particular RAT) attempts to join the network (i.e., a load balancing method). At operation 610, the access node sets a resource usage threshold (e.g., a PRB threshold). The resource usage threshold may refer to a percentage of available resources at which point the network is deemed to be highly-loaded or high-traffic. The resource usage threshold may be predetermined by a network operator, or may be determined in response to a network status. The resource usage threshold may be specific to a particular RAT, or may be a general value used for all RATs. In one particular example, the resource usage threshold may be 80% of available PRBs.

At operation 620, the access node monitors a resource usage corresponding to a first communication mode (e.g., Cat-M1). At some point (e.g., after a predetermined interval and/or upon receiving a join request), at operation 630 the access node compares the monitored resource usage to the resource usage threshold. Thus, the access node determines whether the resource usage exceeds a resource usage threshold as indicated for operation 640. If the determination is that the resource usage does exceed the resource usage threshold, the access node assigns an already-connected wireless device switch from the first communication mode to the second communication mode (e.g., NB-IoT) at operation 650. The access node may cause the switching by transmitting a network command to the wireless device. If the determination is that the resource usage does not exceed the resource usage threshold, the access node may take no further action.

The operations of FIG. 6 may also be applicable when a wireless device that is only capable of communication in the first communication mode attempts to join the network. In such an example, the new wireless device cannot be assigned to use the second communication mode; therefore, the access node may determine that an existing (i.e., already connected) wireless device should be reassigned. The operations of FIG. 6 are not necessarily performed in a strict series from operation 610 to operation 650. In some implementations, the access node may perform operation 610 once for a given period of time, perform operation 620 repeatedly or continuously, and then perform operations 630 to 650 thereafter when appropriate. Afterward, the access node may return to operation 620 without resetting the resource usage threshold.

Figure 7:
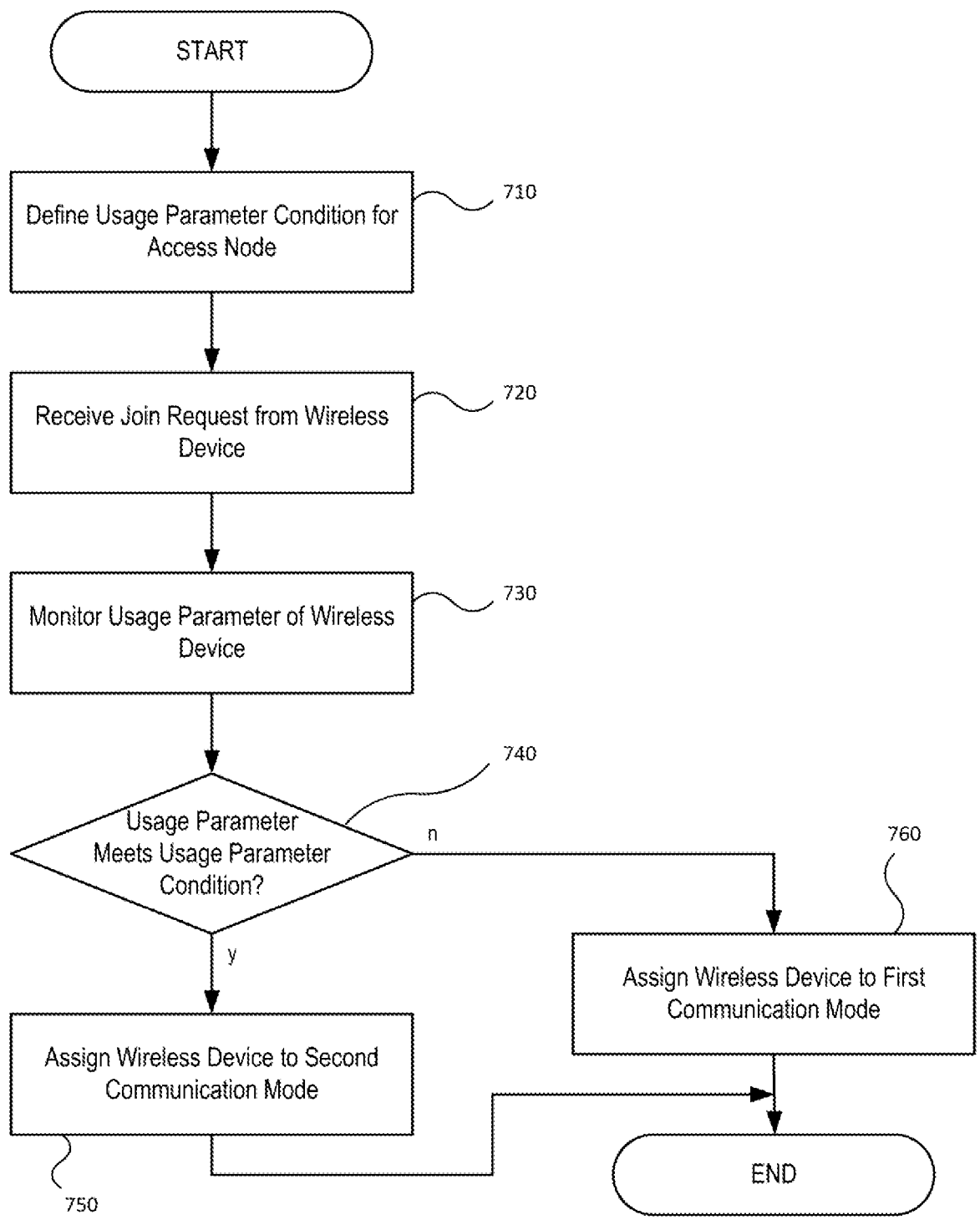
FIG. 7 illustrates another exemplary process flow for managing network resources in accordance with various aspects of the present disclosure.

FIG. 7 illustrates an exemplary method which may be performed when a dual-capable wireless device attempts to join the network (i.e., a device assignment method). At operation 710, the access node defines a usage parameter condition. The usage parameter condition may relate to characteristics of a wireless device which may seek to join the network; for example, a Quality of Service Class Identifier (QCI), a traffic priority characteristic, and the like. In one example, the usage parameter condition may refer to whether a QCI of the wireless device is equal to a predetermined value. The usage parameter condition may be predetermined by a network operator, or may be determined in response to a network status.

At operation 720, the access node receives a join request from a wireless device. In this example, the wireless device is a dual-capable device and the join request may indicate the device capabilities, the usage parameter which forms the basis for the usage parameter condition, and so on. Upon receiving the join request, at operation 730 the access node monitors the usage condition of the new wireless device. In the example where the usage parameter condition refers to whether the QCI of the wireless device is equal to a predetermined value, operation 730 may be or include receiving, detecting, or determining the QCI of the wireless device. At operation 740, the access node determines whether the usage parameter meets the usage parameter condition. For example, the access node determines whether the QCI of the wireless device is equal to the predetermined value (i.e., whether the usage parameter condition is true). If the determination is that the usage parameter does meet the usage parameter condition, the access node assigns the wireless device to the second communication mode (e.g., NB-IoT) at operation 750. If the determination is that the usage parameter does not meet the usage parameter condition, the access node assigns the wireless device to the first communication mode (e.g., Cat-M1) at operation 760.

The operations of FIG. 7 are not necessarily performed in a strict series from operation 710 to operation 760. In some implementation, the access node may perform operation 710 once for a given period of time, and perform operations 720 to 760 each time a wireless device attempts to join the network. Thus, after the wireless has been appropriately assigned (e.g., either operation 750 or 760 has occurred), the access node may return to operation 720 without redefining the usage parameter condition.

Figure 8:
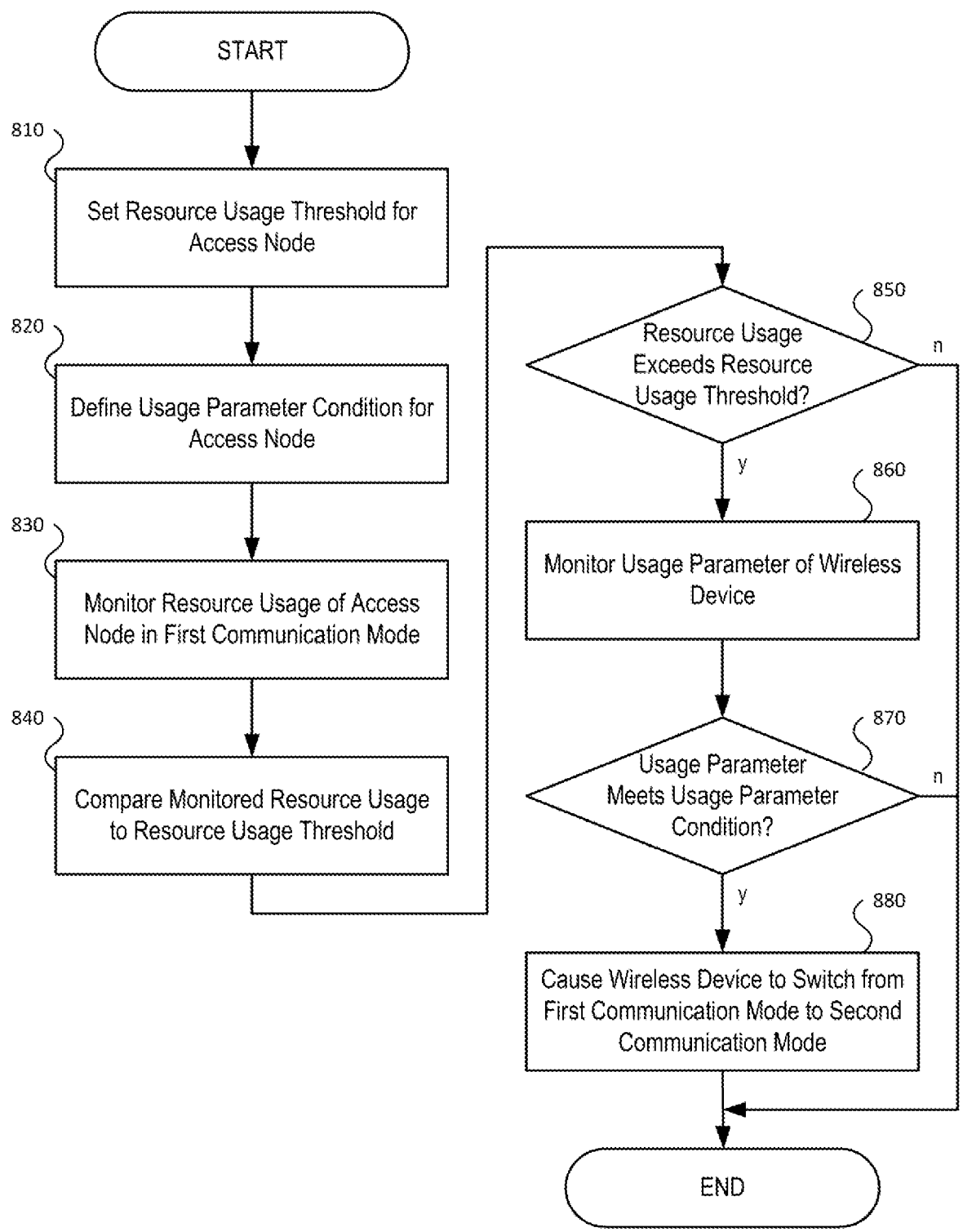
FIG. 8 illustrates another exemplary process flow for managing network resources in accordance with various aspects of the present disclosure.

The present disclosure is not limited to device assignment or switching based only on a resource usage threshold or a usage parameter condition, and in some implementations may cause assignment or switching based on both the resource usage threshold and the usage parameter condition. FIG. 8 illustrates one exemplary method, which may be performed in response to changes in network conditions or when a wireless device that is not dual-capable (or is a dual-capable device which should operate in a particular RAT) attempts to join the network (i.e., a load balancing method).

At operation 810, the access node sets a resource usage threshold (e.g., a PRB threshold). The resource usage threshold may refer to a percentage of available resources at which point the network is deemed to be highly-loaded or high-traffic. The resource usage threshold may be predetermined by a network operator, or may be determined in response to a network status. The resource usage threshold may be specific to a particular RAT, or may be a general value used for all RATs. In one particular example, the resource usage threshold may be 80% of available PRBs.

At operation 820, the access node defines a usage parameter condition. The usage parameter condition may relate to characteristics of a wireless device which may seek to join the network; for example, a QCI, a traffic priority characteristic, and the like. In one example, the usage parameter condition may refer to whether a QCI of the wireless device is equal to a predetermined value. The usage parameter condition may be predetermined by a network operator, or may be determined in response to a network status. In some implementations, the order of operations 810 and 820 may be transposed.

At operation 830, the access node monitors a resource usage corresponding to a first communication mode (e.g., Cat-M1). At some point (e.g., after a predetermined interval and/or receiving a join request), at operation 840 the access node compares the monitored resource usage to the resource usage threshold. Thus, the access node determines whether the resource usage exceeds a resource usage threshold as indicated for operation 850. If the determination is that the resource usage does exceed the resource usage threshold, the access node proceeds to operation 860. If the determination is that the resource usage threshold does not exceed the resource usage threshold, the access node may take no further action.

At operation 860, the access node monitors the usage condition of a wireless device, which may be a device already present in the network or a new device seeking to join the network. In the example where the usage parameter condition refers to whether the QCI of the wireless device is equal to a predetermined value, operation 860 may be or include receiving, detecting, or determining the QCI of the wireless device. At operation 870, the access node determines whether the usage parameter meets the usage parameter condition. For example, the access node determines whether the QCI of the wireless device is equal to the predetermined value (i.e., whether the usage parameter condition is true). If the determination is that the usage parameter does meet the usage parameter condition, the access node assigns an already-connected wireless device switch from the first communication mode to the second communication mode (e.g., NB-IoT) at operation 880. The access node may cause the switching or assignment by transmitting a network command to the corresponding wireless device. If the determination is that the resource usage does not exceed the resource usage threshold, the access node may take no further action. Alternatively, at operation 880 the access node may assign a new device seeking to join the network to the first communication mode or second communication mode, as appropriate, based on the result of operation 870.

The operations of FIG. 8 are not necessarily performed in a strict series from operation 810 to operation 880. In some implementations, the access node may perform operations 810 and/or 820 once for a given period of time, perform operation 830 repeatedly or continuously, and then perform operations 840 to 880 thereafter when appropriate. Afterward, the operation may return to operation 830 without resetting the resource usage threshold and/or redefining the usage parameter condition.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing network resources, comprising:
setting, at an access node supporting Category M1 (Cat-M1) RAT and Narrowband Internet-of-Things (NB-IoT) RAT, a resource usage threshold for the access node to which a wireless device is connected, wherein the wireless device is configured for communication in both of a Cat-M1 RAT and a NB-IoT RAT;
monitoring, at the access node, a resource usage of the access node in the Cat-M1 RAT;
comparing, at the access node, the monitored resource usage to the resource usage threshold; and
in response to a determination that the resource usage exceeds the resource usage threshold, causing the wireless device to switch from the Cat-M1 RAT to the Nb-Iot RAT to improve the overall service delay for IoT devices.

2. The method according to claim 1, wherein the Cat-M1 RAT and the NB-IoT RAT are Internet-of-Things (IoT) RATs.

3. The method according to claim 1, wherein the resource usage is a physical resource block (PRB) utilization percentage.

4. The method according to claim 1, wherein causing the wireless device to switch from the Cat-M1 RAT to the NB-IoT RAT includes transmitting a network command to the wireless device.

5. The method according to claim 1, wherein the resource usage threshold is predetermined by a network operator.

6. The method according to claim 1, wherein the resource usage threshold is determined in response to a network status.

7. A system for managing network resources, comprising:
an access node including at least one electronic processor configured to perform operations including:
setting a resource usage threshold for the access node supporting Category M1 (Cat-M1) RAT and Narrowband Internet-of-Things (NB-IoT) RAT,
monitoring, at the access node, a resource usage of the access node in a Cat-M1 RAT
receiving, at the access node, a join request from a wireless device, wherein the wireless device is configured for communication in both of the Cat-M1 RAT and a NB-IoT RAT,
comparing, at the access node, the monitored resource usage to the resource usage threshold,
in response to a determination that the resource usage does not exceed the resource usage threshold, assigning the wireless device to the Cat-M1 RAT, and
in response to a determination that the resource usage exceeds the resource usage threshold, assigning the wireless device to the NB-IoT RAT to improve the overall service delay for IoT devices.

8. The system according to claim 7, wherein the Cat-M1 RAT and the NB-IoT RAT are Internet-of-Things (IoT) RATs.

9. The system according to claim 8, wherein a first communication mode is a Category M1 (Cat-M1) RAT.

10. The system according to claim 8, wherein a second communication mode is a Narrowband Internet-of-Things (NB-IoT) RAT.

11. The system according to claim 7, wherein the resource usage is a physical resource block (PRB) utilization percentage.

12. The system according to claim 7, wherein the resource usage threshold is predetermined by a network operator.

13. The system according to claim 7, wherein the at least one electronic processor is configured to assign the wireless device to the NB-IoT RAT by transmitting a network command to the wireless device.

14. A method of managing network resources, comprising:
defining a usage parameter condition for an access node supporting Category M1 (Cat-M1) RAT and Narrowband Internet-of-Things (NB-IoT) RAT;
receiving, at the access node, a join request from a wireless device, wherein the wireless device is configured for communication in both of a Cat-M1 RAT and a NB-IoT RAT;
monitoring, at the access node, a usage parameter of the access node;
in response to a determination that the usage parameter does not meet the usage parameter condition, assigning the wireless device to the Cat-M1 RAT; and
in response to a determination that the usage parameter meets the usage parameter condition, assigning the wireless device to the NB-IoT RAT to improve the overall service delay for IoT devices.

15. The method according to claim 14, wherein the usage parameter condition is a condition wherein a Quality of Service Class Identifier (QCI) value of the wireless device is equal to a predetermined value.

16. The method according to claim 14, wherein the Cat-M1 RAT and the NB-IoT RAT are Internet-of-Things (IoT) RATs.

* * * * *